Sept. 18, 1945. H. C. SHOTWELL ET AL 2,384,970
AUTOMATIC FILLING DEVICE FOR BATTERIES
Filed May 20, 1942
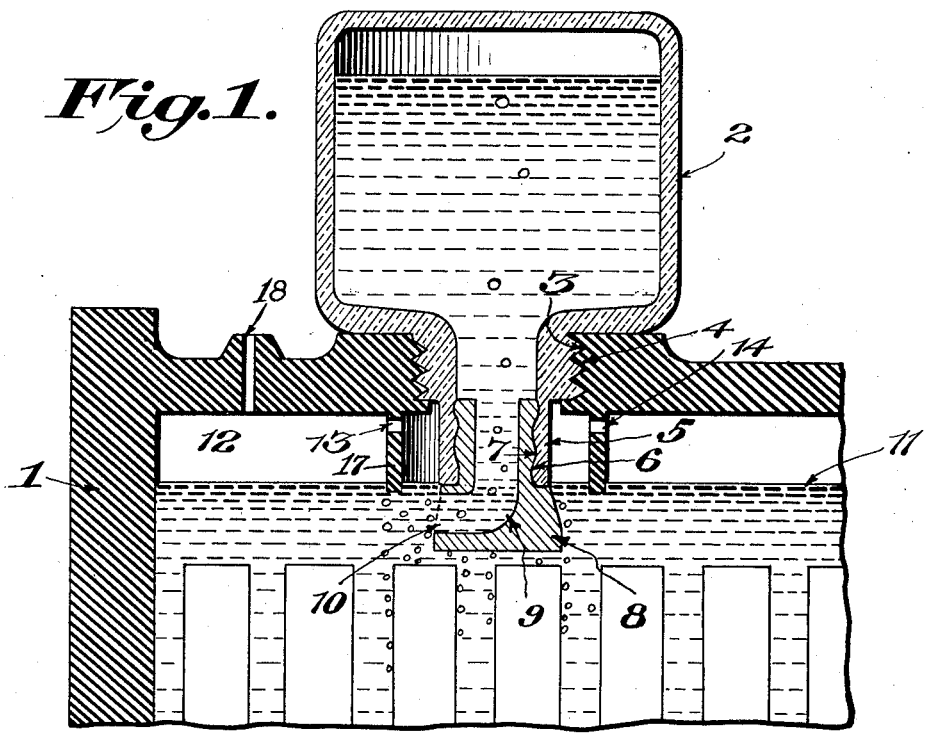
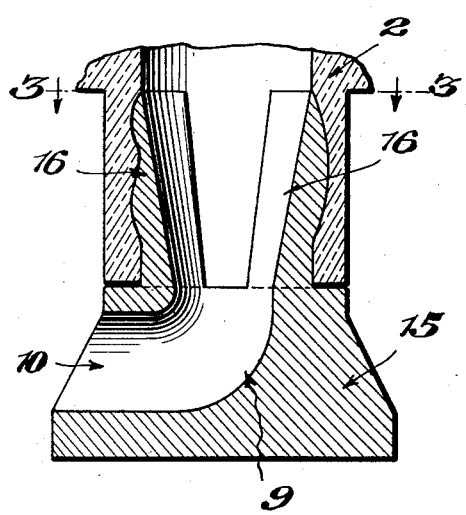
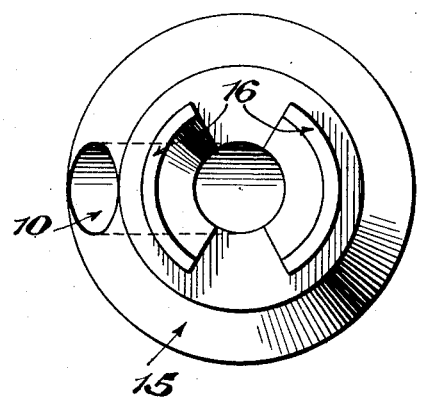
Inventors
H. C. Shotwell,
R. F. Goff,
By Lester L. Sargent
Attorney Patented Sept. 18, 1945

2,384,970

UNITED STATES PATENT OFFICE 2,384,970

AUTOMATIC FILLING DEVICE FOR BATTERIES

Hugh C. Shotwell and Robert F. Goff, Phoenix, Ariz.

Application May 20, 1942, Serial No. 443,792

4 Claims. (Cl. 136—162)

The object of our invention is to automatically maintain the proper amount of electrolyte in the battery and to provide for visual indication of the need for additional liquid and a rapid means for refilling the reservoir.

Our device is designed to give the maximum amount of service with the least amount of attention and keep the battery liquids at the proper level under all conditions. It is also especially designed for quick servicing or refill of reservoir.

It is also an object to provide such a device which is simple in construction and operation, and also can be manufactured at a very low cost.

We attain these and other objects of our invention by the mechanism illustrated in the accompanying drawing, in which—

Figure 1 is a vertical section through our invention applied to a battery;

Fig. 2 is a detail vertical section of a modified form of the invention; and

Fig. 3 is a horizontal section on line 3—3 of Fig. 2.

Like numerals designate like parts in each of the several views.

Referring to the accompanying drawing, 1 indicates the battery casing and 2 designates an inverted bottle or water container having a threaded neck 3 to engage the threaded opening 4 in the battery casing 1. The neck of the bottle has an extension 5 which is unthreaded on its exterior surface 6 but which is interiorly threaded or grooved to receive a correspondingly threaded or grooved exterior surface 7 of a reduction elbow 8, preferably made of rubber, which has an elbow passage 9 extending through to and discharging at 10, the water level 11 in the battery normally being just above the discharge passage 10, whereby when the water level 11 is lowered, additional water will be admitted from the container 2 into the battery chamber 12. We also provide vents 13 and 14 to avoid building up air pressure within shield 17. The function of shield 17 is to reduce the turbulence of the liquid around the filling tube. A vent 18 is provided in the cover to eliminate the possibility of the battery creating any pressure inside the battery case.

Referring to Figs. 2 and 3 there is illustrated a modification of the invention in which a modified reduction elbow plug 15 has its neck divided into spaced upwardly tapering sections 16.

The outlet of the container must be of a size that will allow the liquid to drop or gurgle its contents into the battery casing, but not large enough to allow liquid to run or flow in a steady stream.

The container or reservoir is designed for quick servicing by using the elbow plug 8, which may be of either snap-on or screw type design. The container or reservoir may, if desired, be constructed along the same design all in one piece, which would be more simple in construction and more inexpensive to manufacture, but not as easy or quick to service.

The idea of the elbow outlet from the container is to deflect the gases which the battery produces, away from and past the outlet of the container. Without this angle of the discharge elbow on the container the gases from the battery would enter the outlet of the container and thereby relieve the vacuum in the container and allow liquid to enter the battery casing and rise above the predetermined water level.

The gas escape vents may either be molded or inserted into the container wall past threads in the battery proper.

The container may be constructed either as a screw-into battery type of neck or have the battery constructed for push in or friction inserted type of neck of container.

This device when inserted into the battery becomes, in effect, a part thereof and allows the liquids in the battery and the container to fuse or dilute each other, thus prohibiting freezing until a very low temperature is reached.

What we claim is:

1. In an automatic filling device for batteries, the combination of a non-vented container, a battery casing having an opening suitably shaped to receive the neck of the said container, said battery casing having a vent from the space above the liquid to atmosphere, a portion of the neck of the container extending below the inner surface of the wall of the battery casing, a substantially rigid elbow plug seated on the lower portion of the neck of the container and having an elbow outlet from the neck of the container, the mouth of said elbow outlet being disposed below the level of the surface of the liquid in the battery casing.

2. In combination with the device defined in claim 1, the lower portion of the elbow outlet mouth projecting beyond the upper portion.

3. In an automatic filling device for batteries, the combination of a non-vented inverted container, a battery casing having a threaded opening, the container having a portion of its neck correspondingly threaded to engage said threaded opening, a portion of the neck of the container extending substantially below the inner surface of the top wall of the battery casing, an elbow plug seated on the said lower portion of the neck of the container, said substantially rigid elbow plug having a passage therethrough to automatically discharge liquid from the container into the battery casing as required, the battery casing having a vent from the space above the liquid to atmosphere for the purpose of automatically deflecting and by-passing gases from the mouth of the elbow plug and bringing the distilled water in the container directly to the acid solutions in the battery in order to prevent freezing and to permit easy detachment of the elbow plug for quick replenishment of the container.

4. In an automatic filling device for batteries, the combination of a non-vented inverted container, a battery casing having a threaded opening, the container having a portion of its neck correspondingly threaded to engage said threaded opening, a portion of the neck of the container extending substantially below the inner surface of the top wall of the battery casing, a substantially rigid elbow plug seated on the said lower portion of the neck of the container, the container neck and elbow plug having interfitting configurations with the upper portion of the elbow plug split and expanded to seat in corresponding recesses of the container neck, said elbow plug having a passage therethrough to automatically discharge liquid from the container into the battery casing as required, the battery casing having a vent from the space above the liquid to atmosphere.

HUGH C. SHOTWELL.
R. F. GOFF.